BEHEL & HEDGES.
Grain-Binder.

No. 44,139.

3 Sheet—Sheet 1.

Patented Sept. 6, 1864.

BEHEL & HEDGES.
Grain-Binder.

No. 44,139.

3 Sheet—Sheet 2.

Patented Sept. 6, 1864.

Witnesses
Jas. S. Ferguson.
W. L. Bennem.

Inventors
Jacob Behel
Wheeler Hedges
by their attorney
E. S. Renwick

BEHEL & HEDGES.
Grain-Binder.
No. 44,139.    Patented Sept. 6, 1864.
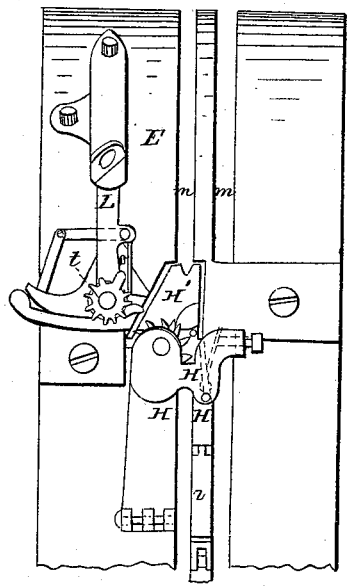
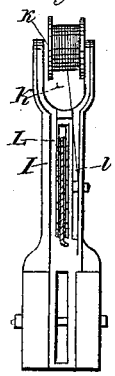
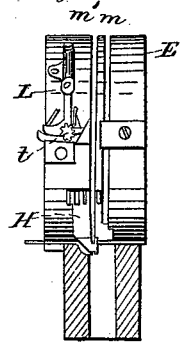
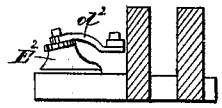
Witnesses
Jas. S. Ferguson.
H. L. Bennon.
Inventors
Jacob Behel
Wheeler Hedges
by their attorney
C. S. Kenrick

UNITED STATES PATENT OFFICE.

JACOB BEHEL AND WHEELER HEDGES, OF EARLVILLE, ILLINOIS, ASSIGNORS TO JACOB BEHEL.

IMPROVEMENT IN BINDING ATTACHMENTS TO HARVESTERS.

Specification forming part of Letters Patent No. 44,139, dated September 6, 1864.

*To all whom it may concern:*

Be it known that we, JACOB BEHEL and WHEELER HEDGES, of Earlville, in the county of La Salle and State of Illinois, have invented certain new and useful Improvements in Harvesting-Machines for the Purpose of Binding Grain; and we do hereby declare that the following is a full, clear, and exact description of our said invention, reference being had to the accompanying drawings, in which—

Figure 1:
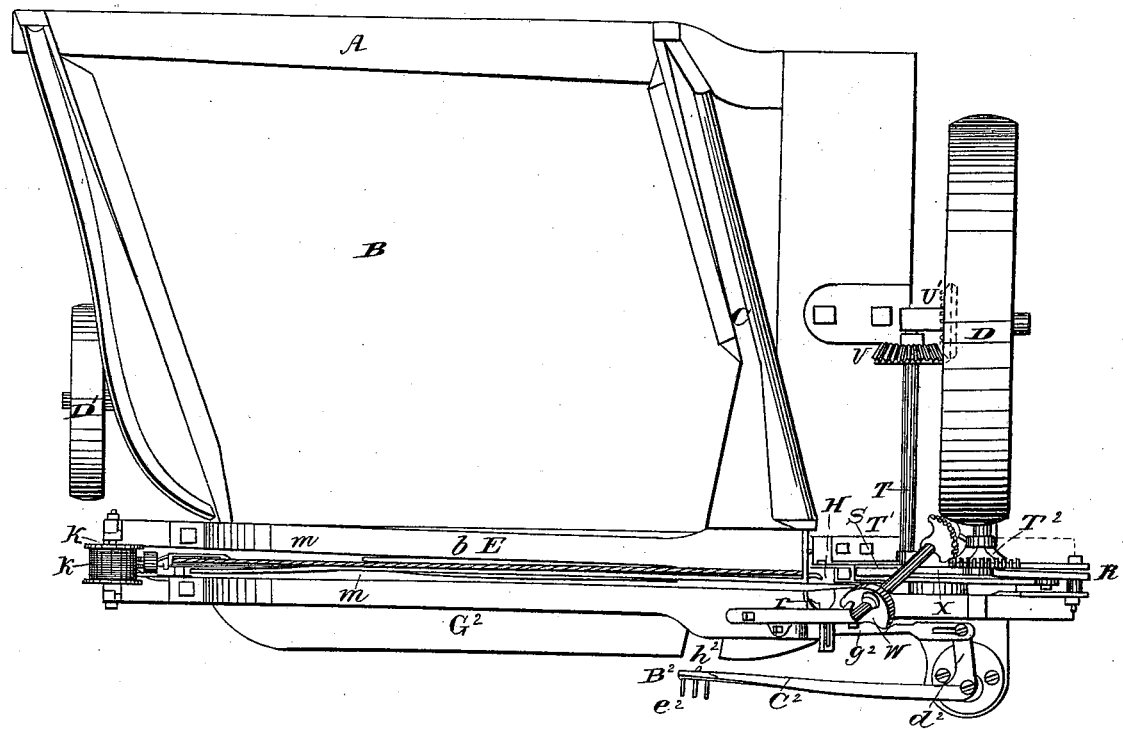
Figure 2:
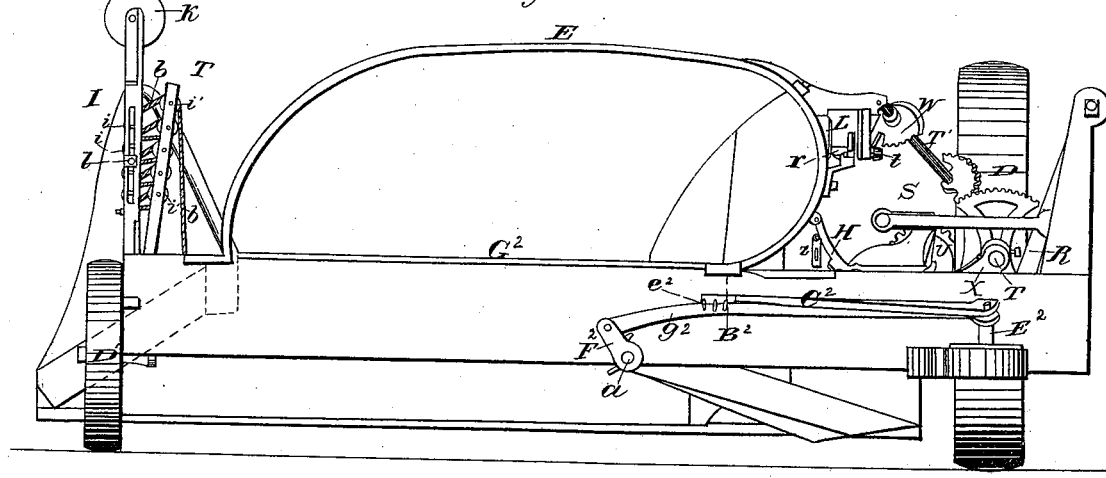
Figure 3:
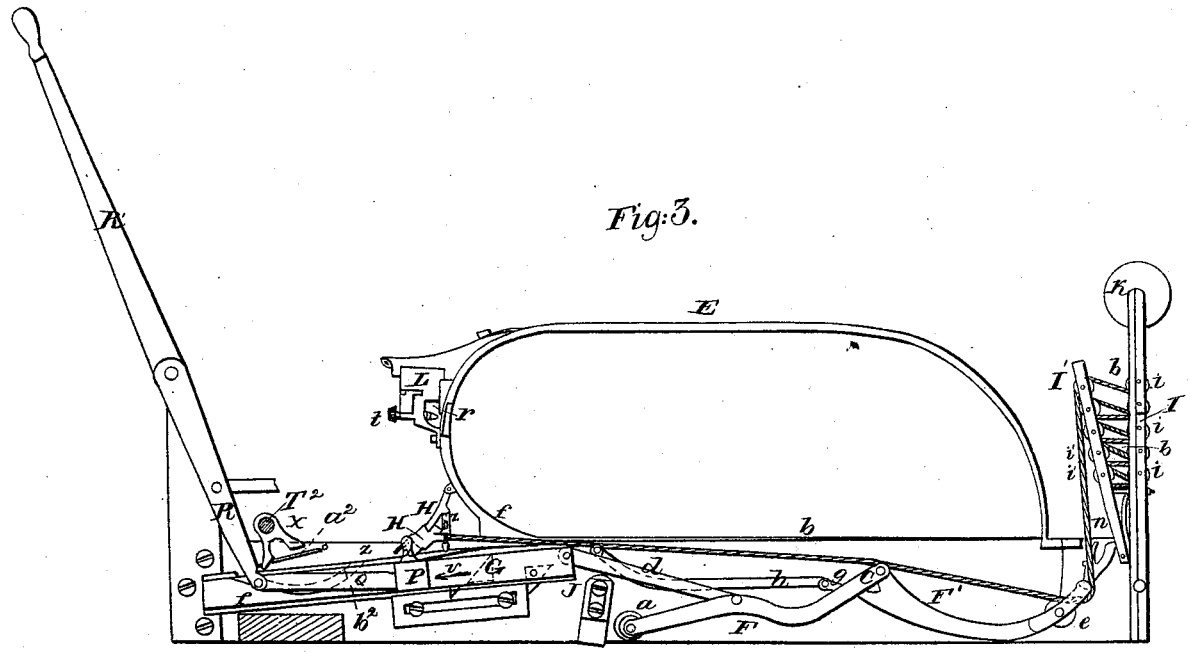
Figure 5:
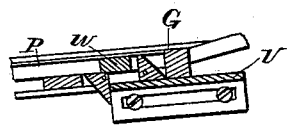
Figure 4:
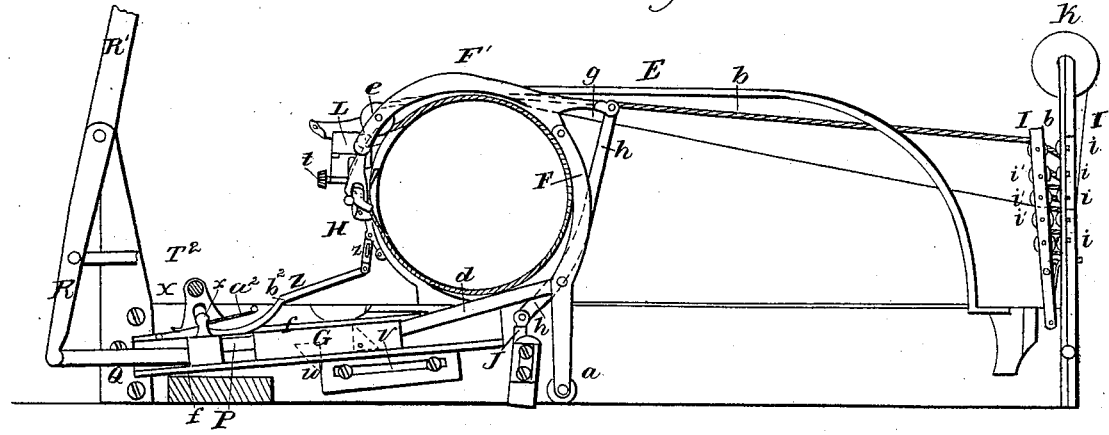

Figure 1 represents a plan of a portion of a harvester with our improvements applied thereto. Fig. 2 represents a rear elevation of the same. Fig. 3 represents a vertical section of the same at the line $x\ x$ of Fig. 1, and looking from the front of the machine. Fig. 4 represents a similar vertical section with the parts in different positions. Fig. 5 represents a longitudinal section of the slide-box and its connections. Fig. 6 represents an edge view of the pulley compressing-belt tension. Fig. 7 represents a transverse section of a part of the machine, showing one end of the binding-frame. Fig. 8 represents a transverse section of a part of the machine, showing the support of the discharging-hand. Fig. 9 represents a fragmentary end view of one end of the binding-frame and the band-securing devices on a larger scale. Figs. 10, 11, and 12 represent parts of the band-securing devices upon the same scale as Fig. 9; and Fig. 13 represents a longitudinal section of the spring connecting-rod, hereinafter described.

The objects of our invention are, to bind grain with facility and dispatch, as fast as it is cut by the harvesting-machine to which our binding apparatus is applied, and to discharge the bound sheaves from the machine.

To this end the first part of our invention consists in the combination of a peculiar jointed arm (for carrying either a compressing-belt or binding material, or both) with instrumentalities for alternately extending its members in line with each other, or thereabout, (to reach the whole of t e loose grain,) and drawing in said members to cause them to embrace the grain as it is compressed into a compact gavel.

The second part of our invention consists in the combination of one member of said jointed arm with an adjustable fulcrum, by whose action said member is caused to turn on the other mem' er of sa'd arm to embrace the grain.

The third part of our invention consists in the combination of on arm for carrying the compressing-belt or the binding material with a slotted frame for guiding it while moving, so that the end of said arm is compelled to move in a precise track.

The fourth part of our invention consists in the combination of a flexible compressing-belt with a slotted frame, so that it is guided while being moved, and thus caused to apply itself properly to the grain.

The fifth part of our invention consists of a peculiar tension apparatus for the compressing-belt, composed of two sets of pulleys on which the compressing-belt is wound, one of which sets is pressed from the other by a spring or weight, so that it will give out and take up a sufficient length of belt to compress the gavel with but a small amount of motion.

The sixth part of our invention consists of the combination of the reel of the binding material and the arm that carries the said material round the grain with an adjustable guide located between the two, so that the direction of the delivery of the binding material to the carrying-arm may be adjusted to the requirements of the machine.

The seventh part of our invention consists of the combination of the compressing-belt at the end nearer the band-securing devices with a movable holder, by which that end of the belt is moved out of the track of the grain in its movement to and from the place where it is bound.

The eighth part of our invention consists of the combination of the holder which holds the end of the binding material near the band-securing devices with a movable support, by which the end of the binding material is moved out of the track of the grain in its movement to and from the place where it is bound.

The ninth part of our invention consists of the combination of the compressing and band applying and securing devices with the same reciprocating instrument in such manner that all are operated in their proper order by the reciprocation of that one instrument, which may be moved either by hand or by the power of the machine to which the binding mechanism is applied.

The special object of the tenth part of our invention is to engage and disengage automatically some of the instrumentalities employed in binding from the power which operates them; and it consists of the combination of a reciprocating piston, slide-box, detent, and controlling-plate, operating substantially as hereinafter described.

The special object of the eleventh part of the invention is to permit the terminal positions occupied by some of the instrumentalities of the binding mechanism to be varied without varying the stroke of the reciprocating instrument with which they are engaged and disengaged; and it consists of the combination of a reciprocating piston and slide-box with two detents and an adjustable controlling-plate, operating substantially as hereinafter described.

The special object of the twelfth part of our invention is to withdraw the bound sheaf from the place where it is bound. It consists of the combination of the binding mechanism with a turning and reciprocating discharging-hand, which withdraws the bound sheaf from the binding-frame, and is then withdrawn from the sheaf by the forward movement of the machine.

The machine represented embodies all our improvements in connection with mechanism for securing the band, constructed in accordance with the patent granted to Jacob Behel the 16th day of February, A. D. 1864. The finger-beam A, grain-platform B, grain-board C, driving-wheel D, and grain-wheel D' of this machine are substantially the same as the corresponding parts of many machines in use. We do not, therefore, deem it necessary to describe them particularly, nor to represent in the drawings the cutting apparatus and its gearing, the reel and its appurtenances, and other customary parts of a harvesting-machine, which are not changed by our invention.

The binding mechanism is located at the back beam of the machine, where a frame, E, is erected, into which the grain that has fallen upon the platform is projected, head foremost, by the action of a fork or rake, operated either by hand or by machinery, and is then compressed and bound. This frame is of sufficient size to admit the grain to be bound in a loose condition. The tension apparatus and cord-reel are situated at one end of it (that nearer the standing grain) and the band-securing devices at the other end of it, (that nearer the main driving-wheel D.) The compressing strap or belt b is applied to the grain by means of a peculiar jointed arm, which, when not operating, is received in a recess at the lower side of the frame E, where it is then entirely out of the way of the grain during its movement into the frame E and the removal of the bound sheaf therefrom. This jointed arm is composed mainly of two members, an inner or main member, F, and an outer member, F'. The inner member, F, is secured to a center-pin, a, which turns in bearings in the timbers of the frame which form the recess in which the arm is received when extended, and the outer member, F', is pivoted at its inner end to the outer end of the inner member, F, so that the two members can be extended nearly in line with each other, as shown at Fig. 3, to reach all the grain within the binding-frame, or drawn in to embrace the grain, as shown at Fig. 4. In order to move this jointed arm, the inner member, F, is connected by links d with the end of a slide, G, which will hereinafter be designated as the "slide-box," so that when this slide-box is moved to and fro the inner member is raised or depressed. This slide box is constructed to slide in ways or guides f, secured to the adjacent faces of the timbers which form the recess beneath the binding-frame. The inner end of the outer member of the jointed arm is provided with a shank, g, which extends beyond the pivot that connects the two members together, and is connected with one end of a strut, h, whose other end is connected with and bears against an adjustable fulcrum, J, secured to the frame of the machine. As this fulcrum is stationary, the movement of the outer member of the jointed arm toward it by the rising of the inner member causes the outer member to turn as a lever on its pivot c as a fulcrum; and as the strut h approaches a line perpendicular to the line in which the links d move, the nearer the arm is drawn toward the band securing devices the combination acts as a toggle-joint with increasing force as it is contracted. In this combination of parts the position of the stationary fulcrum J determines the vertical position attained by the extreme end of the jointed arm, and this fulcrum is made adjustable, so that its position can be varied to compensate the wear of the joints and compel the end of the arm to attain the precise vertical position it is required to occupy at the time the band is secured. This is important, because the arm carries the compressing-belt and the binding-cord, and the latter must be delivered with certainty to the band-securing devices.

The arm is guided in its movement by the longitudinal slot m in the frame E, in which it moves, so that its end cannot vary laterally from the track it should traverse. This slot also acts as a guide for the compressing belt b, which is a flexible belt of leather or rope. This belt is secured at one end to a movable belt-holder, H, hereinafter described, which also carries the cord-holder. It is passed through a slot in the end of the jointed arm, and its opposite end is secured in a tension apparatus, I I', which gives out and takes up the compressing-belt according to the requirements of the machine. The slot in the arm F', through which the compressing-belt is passed, is provided with sheaves e, over which the belt passes so as to diminish the friction. The tension apparatus consists of two sets of sheaves or pulleys, i i', the one contained in a stationary standard, I, which also supports the reel K of binding-cord, and the other set carried by a swinging standard, I', which is hinged at its lower end to the reel-standard I, and is pressed from it by a spring. The compressing-belt is passed to and fro from pulley to pulley, as shown at Fig. 3, so that the movement of the swinging standard a short distance toward or from the reel-standard lets off or takes up a sufficient length of belt to encircle the grain, while the requisite tension is imparted by the spring j, between the standards I I'.

The cord-reel K, which is supported by the standard I, has a tension-spring, k, applied to one of its cheeks, so as to make sufficient resistance to the drawing off of the binding-cord to keep it taut upon the gavel. In order that the binding-cord may pass properly from the reel to the arm which carries it around the grain, an adjustable cord-guide is provided between the cord-reel and the cord-carrying arm, which is the jointed arm F F'. This guide consists of a perforated block, l, which is arranged to slide up and down in a slot in the reel-standard I, and is provided with a clamp screw and nut, so that it can be secured in any desired position, about the best position for it being in a horizontal line drawn through the center of the binding-frame E. In order that the arm F F' may control the binding cord, the end of its outer member is provided with a pair of small sheaves, (drawn in dotted lines in Figs. 3 and 4,) between which the cord is passed, and with a fork, n, which applies the cord to the cord-holder that holds it while the knot is tied.

The cord-holder and the knot-tying mechanism are of the same construction as that described in the patent granted to Jacob Behel the 16th day of February, A. D. 1864, the cord-holder being a cylinder having a roughened surface, operating in combination with a spring presser-plate, as shown on an enlarged scale at Figs. 9 and 12, between which and the cylinder the cord is pressed down by the operation of the cord-carrying arm. The knot is tied by means of Behel's tying-bill r, which is mounted in a swinging frame, L, and is operated by a reciprocating rack, s, acting on a pinion, t, having an enlarged tooth, which is secured to the shaft of the tying-bill. In order that the knot-tying devices may be operated with facility, and that they may not interfere with the mechanism for imparting motion to the cord-carrying arm, it is expedient that they should operate at about the middle of the side of the binding-frame, and therefore the tying-bill is arranged to operate at that place, as shown at Figs. 2, 3, 4, and 7. On the other hand, it is necessary that the binding material and the compressing-belt should be held out of the way of the grain when the latter is being moved to and from the place where it is bound. This holding of the belt and cord is effected at one end of the binding-frame E by causing the arm, which carries the cord and belt when extended, to descend into the recess at the lower side of that frame. It is effected at the other end of the binding-frame by securing the end of the compressing-belt and the cord-holder H, which holds the end of the binding cord, to a movable plate or belt-holder, H', which turns upon a hinge in such manner that when it is turned up, as at Figs. 4 and 9, the ends of the belt and cord are placed in the positions they occupy during binding, and when the movable belt-holder is turned down, as at Figs. 2, 3, and 7, the ends of the belt and cord are depressed below the level of the under side of the binding-frame, so that both belt and cord then lie in the recess provided for the cord-carrying arm, where they are out of the way of the grain. The upper end of this movable belt-holder is received, when raised, in a recess in the binding-frame E, and its outer face is then flush with that of the binding-frame, so that when the fork n, carried by the cord-carrying arm F F', is drawn in and caused to glide down the outer surface of the binding-frame it glides over the surface of the movable belt-holder (which does not obstruct its movement) and enters the narrow space between the cord-holder and the adjacent face of the belt-holder. In order that the cord may not be misplaced during its application to the gavel of grain, it is guided by a slot, m', formed in the binding-frame. The belt-holder H is also slotted to permit the cord to be depressed into the recess at the lower side of the frame. The outer end of the bolt-holder also has a notch formed in it to hold the cord from moving laterally out of its proper position when the belt-holder is moved up and down. The movable belt-holder in this machine thus constitutes the movable support for the cord-holder, and obviates the necessity of making a separate movable support for that purpose.

After the knot is tied, the band around the sheaf is severed from the remainder by a stationary knife, o, against the edge of which the cord is drawn by the backward movement of the tying-bill when its swinging frame L is caused to retrograde. This knife is made adjustable, so that it can be set up to its work as its edge is worn away by sharpening.

In the present machine the various mechanisms for compressing the gavel, for applying the binding material to it, and for securing the ends of the band are all combined together so that they are operated by the movement of the same reciprocating instrument, which may be moved either by hand or by one of the running wheels of the machine. This instrument is a piston, P, which is connected by a connecting-rod, Q, with the lower end of an arm, R, to which a vibrating movement may be imparted either by a revolving crank, S, or by a hand-lever, as drawn in red lines at R', Fig. 3. In the former case the crank is applied to a shaft, T, which is driven through the intervention of a pair of beveled wheels, U U', by the main running wheel D of the machine, which also imparts motion to the cutting mechanism, to the reel, and to the rake when an automatic rake is used. When the hand-lever is used, it is operated by an attendant, who rides upon a platform or a seat secured to the frame of the machine. In the operation of binding, the grain must be compressed and the binding material must be applied before the band-securing devices operate; and, on the other hand, the band-securing devices must operate while the compressing mechanism and band-applying devices remain at rest. In order that the piston P may operate the one set of devices while the others remain at rest, it is alternately engaged and disengaged with each. In order that it may be engaged and disengaged from the compressing mechanism and band applying devices, its stem is constructed to slide in the slide-box G, which is fitted with a turning detent, $u$. This detent may be turned up, as shown in dotted lines at Fig. 3, in which case it protrudes into the slide-box, or may be turned down, as in Figs. 4 and 5, in which case its upper surface is flush with the inside of the slide-box, and therefore does not prevent the movement of anything within said box. The position of the detent is controlled by an adjustable controlling-plate, V, which is beneath the slide-box, and which, bearing against the under side of the detent when it is raised, holds it erect. When, however, the slide-box G is moved in the direction of the arrow $v$, beyond the end of the controlling-plate V, the latter no longer holds up the detent, but permits it to turn down. The stem of the piston P, which slides in the box, has a slot formed in it of sufficient size to admit the detent $u$ when it is raised, so that when the piston is moved in the direction of the arrow $v$ the butt $w$ of the piston at the end of the slot, bearing against the raised detent, compels the detent and slice box to move with it until the detent passes the end of the controlling plate V, when the detent, turning down, disengages the slide box from the piston, whose butt then slides over the detent without imparting motion to the slide-box and to the cord-carrying arm F F' and its appurtenances, with which it is connected, so that these all remain at rest in the positions they have been placed by the movement of the slide-box, while the piston continues to move to the extremity of its stroke. When the piston is moved back again, it passes over the detent $u$, and communicates no motion to the slide-box until its butt comes in contact with a second detent, $u'$, which operates in the same manner as the first, but in the reverse direction, so that the piston then pushes back the slide-box and causes the cord carrying arm and its appurtenances to be extended to their utmost limit, at which time the second detent is permitted to turn down, as shown at Fig. 3, by passing the adjacent end of the controlling-plate V, so that the devices operated through the slide-box then remain at rest until the piston in its return motion acts upon the first detent, $u$, although the piston has a greater range travel than is necessary to extend the cord-compressing arm. The position of the controlling-plate controls (through the detent) the distance the terminal positions of the jointed arm at the two extremes of its movement, and therefore the conductor of the machine has it in his power to adjust the terminal positions of the cord-compressing arm and its appurtenances by varying the position of the controlling-plate V.

In order that the same piston, P, may operate the band-securing devices and disengage from them to leave them at rest during the movements of the cord-carrying arm and its appurtenances, the reciprocating segmental rack W, that operates the swinging frame L and the tying-bill, is secured to one end of a rock-shaft, T', whose opposite end is fitted with a cog-segment whose teeth engage with those of a corresponding segment secured to a rock-shaft, $T^2$. This rock-shaft $T^2$ is supported by bearings secured to the frame of the machine, and is fitted with a forked arm, X, by the vibration of which the rack W is caused to move to and fro. This forked arm, when the band-securing devices are not operating, occupies the position in which it is drawn in black lines in Figs. 2 and 3, so that it is in position to be operated upon by a stud, $x$, which is made fast to the head of the piston P while the piston is moving in the direction of the arrow $v$ and after it has been disengaged from the slide-box; hence the piston in its continued movement causes the stud $x$ to engage with the vibrating forked arm to move it and operate the band-securing devices. The engagement of the piston with the band-securing devices (through the stud $x$ and forked arm X) continues until the piston, having completed its stroke in the direction of the arrow $v$, returns sufficiently to disengage the stud from the forked arm. The band-securing devices are then left at rest, while the continued movement of the piston operates the cord-compressing arm, as before described. The movement of the piston in the direction of the arrow $v$ causes the reciprocating rack W to operate the tying-bill and tie the knot in the band; and the return movement withdraws the tying-bill and its appurtenances and causes the cord to be cut.

In order that the movable belt-holder H may be raised by the piston at the same time that the cord-carrying arm applies the compressing belt and cord to the grain, it is connected by a rod, $z$, with a lever, Z, which is pressed upon the head of the piston by a spring, $a^2$, and is bent at $b^2$, so that when the piston moves in the direction of the arrow $v$ its head, passing beneath the bent portion of the lever Z, raises its end and pushes up the belt-holder to its proper position, where it is held by the bearing of the head of the piston against the under side of the lever Z until the piston in its return movement again passes by the bend of the lever, whereupon the spring $a^2$ depresses the lever and the movable belt-holder, which it controls. In order to compensate the wear of the parts and cause the movable belt-holder to be held in its place when raised, the connecting-rod $z$ is formed in two parts, one of which slides in the other and is connected with it by a pin working in a a slot which permits a certain amount of movement. A spring is arranged in a socket in one of the parts, as shown in section at Fig. 13, to cause the two to extend as far as the slot will permit; hence, when the joints wear, the spring extending the connecting-rod compensates the amount of play produced by such wear.

As the tying-bill and its appurtenances and the turning cord-holder are substantially the same as those described in the aforesaid Behel patent, it is not deemed necessary to describe them in detail.

After the grain is bound into sheaves, it is discharged from the machine automatically by means of a discharging-hand, $B^2$. This hand consists of a stock furnished with fingers or tines, and is pivoted to the end of an arm, $C^2$, so that it can either be placed with its fingers $e^2$ erect or turned back, as in Figs. 1 and 2. The butt of the arm is pivoted to a stand secured to the frame of the machine, and is fitted with a branch, $d^2$. The surface of the stand $E^2$, on which the butt of the arm $C^2$ is pivoted, is inclined to the surface of the bottom of the binding-frame on which the sheaf lies, so that as the hand is moved backward it is caused to descend. The operation of this discharging-hand is to withdraw the bound sheaf from the binding-frame, to permit it to fall, and then to withdraw from it. In order that it may work in connection with the binding mechanism, and also to be operated by the jointed cord-carrying arm F F', a secondary arm, $F^2$, is secured to the center-pin $a$ of the jointed arm F F', and this arm $F^2$ is connected by a rod, $g^2$, with a pin secured to the branch $d^2$ of the discharging-arm, so that the said arm, with the hand, is caused to vibrate toward and from the back beam of the machine. A recess is formed in the back beam of the machine to receive the stock of the discharging-hand when its fingers are upright, and a thumb, $h^2$, is secured to the stock in such manner that when the hand is vibrated toward the back beam and enters the recess therein the thumb $h^2$ bears against the face of the said beam and turns the hand so that its fingers are caused to turn up and protrude into the gavel of grain. When the hand is vibrated away from the back beam, the upright position of the fingers is maintained by a stop on the arm $C^2$, which prevents them from turning forward, but is no longer controlled by the thumb $h^2$; hence, when the sheaf strikes the ground and is detained by contact with it, the fingers, turning down backward, are withdrawn from the sheaf as the machine moves onward. The discharging-hand should not tend to remove the sheaf until the compressing-belt is removed from it. In order that it may operate in this manner, the end of the connecting-rod $g^2$, which takes hold of the pin of the discharging-hand, is slotted, to permit it to be moved some distance before it acts upon the discharging-hand, so that the last remains at rest until the cord-carrying arm has withdrawn the compressing-belt sufficiently to free the sheaf.

In the machine thus described the band-securing devices are those invented by Jacob Behel, and we prefer to use them; but it is clear that the various parts of our invention may be used in connection with different devices for securing the band, in case such are preferred. The machine also does not contain any automatic means of moving the cut grain from the platform into the binding-frame, this operation being supposed to be effected by the use of a fork operated by an attendant who stands or sits upon the machine; but we propose to use our invention in connection with raking mechanism put in motion by one of the running wheels of the machine, in which case the binding and raking mechanism must be arranged or combined to operate at proper intervals and consecutively. During the binding, the grain lies upon the two timbers which form the bottom of the binding-frame, and any tendency to tip over backward is prevented by the plate $G^2$, which supports the gavel of grain behind its center where the band is applied. We prefer to use cord as the binding material; but some other suitable material (wire for example) may be used, provided the band-securing devices and the instruments for applying such material to them be constructed to suit the nature of the material employed. We also prefer to arrange the band-securing mechanism at the end of the binding frame nearer the main driving-wheel, because it is then in the most convenient position to enable the power to be applied to it; but it is obvious that, if deemed expedient, the band-securing devices may be arranged nearer the grain-wheel, in which case the whole binding apparatus will be reversed end for end. Then, in case the power is applied by hand, the binder may stand or sit behind the divider of the machine in such a position as will also enable him to rake or fork the grain to the binding apparatus. The binding mechanism and driver's seat may also be so arranged relatively to each other that the driver may operate the binding mechanism without leaving his seat; or the binding mechanism, when operated by the power of the machine, may be thrown into or out of gear by the driver; or the raking mechanism may be operated automatically and the binding mechanism by hand. In case a sweep-rake is used, by which we mean one sweeping like the arm of a wheel over a segmental circular platform, the binding apparatus will be arranged at the posterior side of that platform, and consequently at an angle to the line of progression of the machine instead of perpendicular thereto, as shown in the drawings.

We have described our improvements as adapted to the binding of grain in connection with a harvesting-machine; but the greater part of our improvements are applicable to the binding of other substances which require to be bound in bundles or fagots.

Having thus described the best mode with which we are acquainted of embodying our improvements in a working machine, what we claim as our invention, and desire to secure by Letters Patent, is—

1. The combination of the jointed arm with instrumentalities for alternately extending its members in line with each other, or thereabout, (so as to reach the loose grain,) and for drawing them in, to embrace the grain as it is compressed, the whole operating substantially as set forth.

2. The combination of one member of said jointed arm with an adjustable fulcrum, substantially as set forth.

3. The combination of the arm for carrying the compressing-belt or the binding material, or both of these, with a slotted frame to guide the extremity of the arm while it is moving, substantially as set forth.

4. The combination of a flexible compressing-belt with a slotted frame, so that it is guided while being moved, substantially as set forth.

5. The compressing-belt tension herein described, consisting substantially of two sets of pulleys pressed apart by a spring or its equivalent, the whole operating substantially as set forth.

6. The combination of the reel of the binding material and the arm that applies said material to the grain with an adjustable guide located between the two and operating substantially as set forth.

7. The combination of one end of the compressing-belt with a movable belt-holder, by which that end of the belt is moved out of the track of the grain, the combination operating substantially as herein set forth.

8. The combination of the holder, which holds the end of the binding material, with a movable support, by the movement of which the outermost portion of the binding material is moved out af the way of the grain, substantially as set forth.

9. The combination of the compressing and band applying and securing devices with the same reciprocating instrument in such manner that all are operated in their proper order by the reciprocation of that one instrument, substantially as herein set forth.

10. The combination of the reciprocating piston, slide-box, detent, and controlling-plate, the whole operating substantially as herein set forth.

11. The combination of the reciprocating piston and slide-box with two detents and an adjustable controlling-plate, the whole operating substantially as set forth.

12. The combination of the binding mechanism with a reciprocating and turning discharging-hand which withdraws the bound sheaf from the place where it is bound, and is then withdrawn from the sheaf, substantially as set forth.

In testimony whereof we have hereunto subscribed our names.

JACOB BEHEL.
WHEELER HEDGES.

Witnesses:
WM. R. HAIGHT,
D. M. VOSBURGH.